No. 840,002. PATENTED JAN. 1, 1907.
J. W. LARISH.
DUPLEX TELEGRAPH.
APPLICATION FILED AUG. 29, 1906.
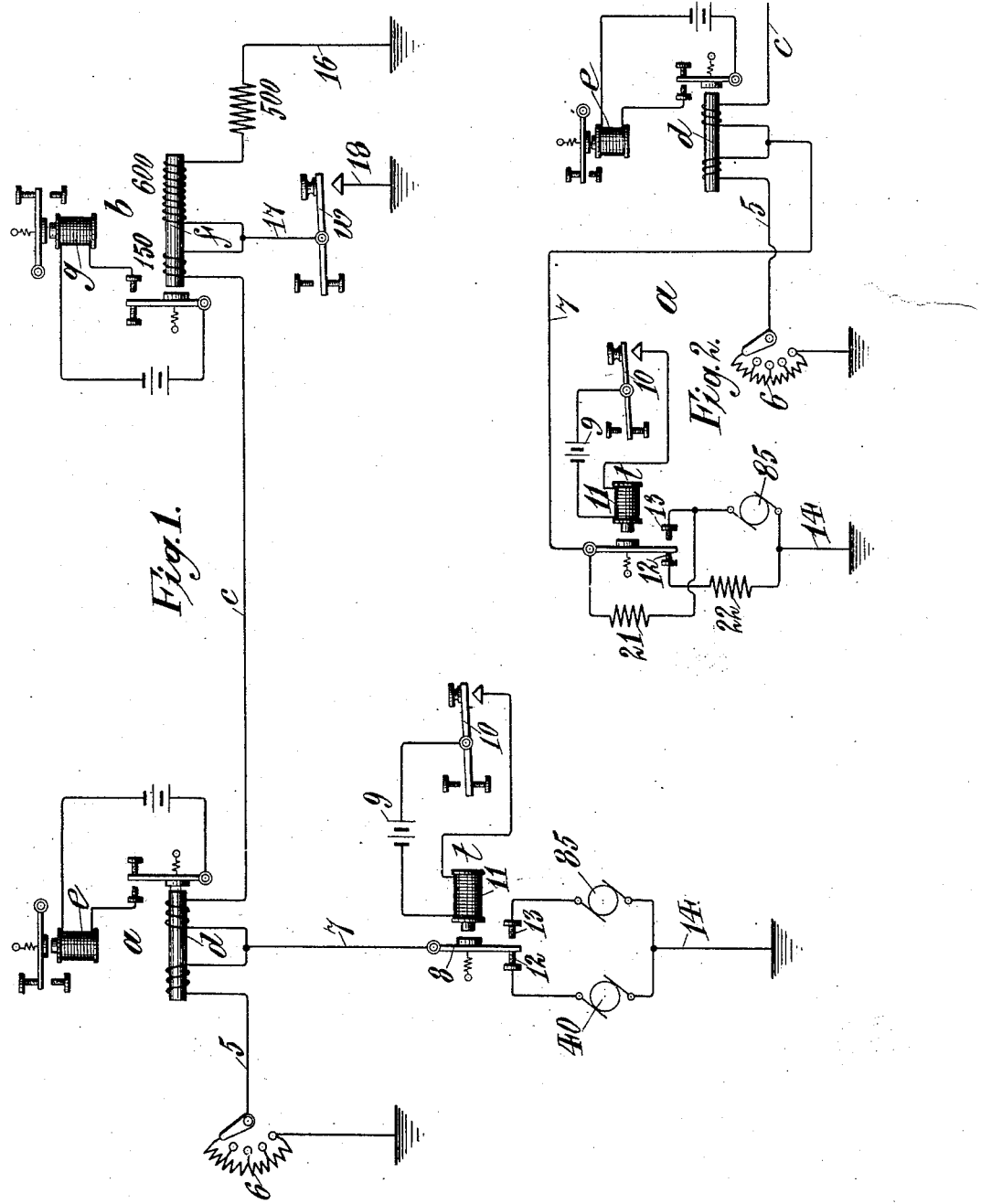

UNITED STATES PATENT OFFICE.

JOSEPH W. LARISH, OF NEW YORK, N. Y., ASSIGNOR OF ONE-HALF TO POSTAL TELEGRAPH-CABLE COMPANY, OF NEW YORK, N. Y., A CORPORATION OF NEW YORK.

DUPLEX TELEGRAPH.

No. 840,002.　　　　Specification of Letters Patent.　　　　Patented Jan. 1, 1907.

Application filed August 29, 1906. Serial No. 332,417.

*To all whom it may concern:*

Be it known that I, JOSEPH W. LARISH, a citizen of the United States, residing in the city of New York, in the county of New York, State of New York, have made certain new and useful Improvements in Duplex Telegraphs, of which the following is a specification.

This invention relates to apparatus for simultaneously transmitting two sets of signals in opposite directions.

The object of the invention is to provide a duplex telegraph having a battery or source of electricity at one terminal station only, and to thus provide for duplexing a so-called "city line" or "short line" connecting a main office with a branch office.

At the main station there is provided two sources of electric current of respectively different electromotive force, a transmitter branch circuit, a transmitter which operates to direct one or the other of these two current sources to line, a differential receiving instrument, and an artificial line containing a rheostat. At the substation there is a transmitter in a transmitter branch, an artificial line containing a resistance, and a receiving instrument having two coil-windings. One winding is of greater resistance than the other and is placed in the artificial line. The transmitter has a connection with the junction of these two coils and a contact-point connected to ground. Normally the ground-contact is broken and the two coil-windings are in series, the artificial line with its resistance being included as part of the main circuit in series therewith. When the transmitter is closed, the junction of the two coil-windings is connected to ground and the larger coil-winding with the artificial line and its resistance is removed from the main circuit. The receiving instrument at the main station responds to current impulses from either source of electricity, the receiving instrument at the substation responds to current impulses of the higher electromotive force only, and the two coil-windings on the receiving instrument at the substation are so proportioned that the ampere-turns when the coils are in series relation are substantially equal to the ampere-turns of the smaller coil when the transmitter at the substation is on its ground contact.

The accompanying drawings illustrate the invention.

Fig. 1 is a diagrammatic view of the improvement with two separate sources of electricity of respectively different electromotive force at the main station. Fig. 2 is a modification showing a single source of electricity arranged to supply current at two respectively different potentials.

$a$ is a main telegraph-station.

$b$ is a substation, such as a branch office in a hotel or public building where it is inconvenient to maintain a source of main-line current.

$c$ is the main line uniting stations $a$ and $b$.

$d$ is the ordinary differential relay having two coil-windings of, say, one hundred and fifty ohms each. Relay $d$ operates a reading-sounder $e$ through the medium of a local circuit in a well-known manner. There is an artificial line 5, containing a rheostat 6. Let us assume that the rheostat has fourteen hundred ohms in circuit. One coil of relay $d$ is in the artificial line 5, the other coil is in the main line $c$.

7 is a transmitter branch connected to the junction of the coils of relay $d$.

$t$ is a transmitter consisting of a pivoted lever 8, connected to the transmitter branch 7, a local battery 9, and a Morse key 10 in a local circuit, with the magnet 11 controlling the lever 8. There are two dynamo-electric machines 40 and 85. One and the same pole on each dynamo is connected to ground at 14. The dynamos are of respectively different electromotive force. Let us assume dynamo 85 furnishes eighty-five volts and dynamo 40 furnishes forty volts. Dynamo 85 is connected to the contact-stop 13, dynamo 40 is connected to contact-stop 12.

At the substation relay $f$ operates a reading-sounder $g$ through the medium of a local circuit in a well-known manner.

16 is an artificial line containing a resistance 500. Let us assume that the resistance amounts to five hundred ohms.

$w$ is a Morse key connected by wire 17 to the junction of the two coils of the relay $f$. It has a ground-contact 18. The relay $f$ has two coil-sections 150 and 600. These are wound in the same direction on the iron core. The coils are of respectively different resistance and magnetizing power. We may assume that the coil 150 has one hundred and fifty ohms resistance, and the coil 600 has six hundred ohms resistance.

The operation of the apparatus is as follows: When the transmitter $t$ is open, the current of dynamo 40 is to line. Its effect is differential in the coils of relay $d$, and the relay $f$ is adjusted above the strength of current under any and all conditions due to this electromotive force. When transmitter $t$ is closed, dynamo 85 is to line, and its effect on relay $d$ is differential, as before; but relay $f$ under any and all conditions responds to this electromotive force. Considering station $b$, the coils of relay $f$, when transmitter $w$ is open, as shown, conspire with each other, circuit passing in series through coil 150, coil 600, resistance 500, to ground. The ampere-turns enable this relay to respond to an electromotive force of eighty-five volts from station $a$, but to remain neutral to an electromotive force of forty volts from said station. When transmitter $w$ is closed, relay $d$ is thrown out of balance and responds to a current due to either the forty-volt or the eighty-five-volt source of electricity. The one-hundred-and-fifty-ohm coil of relay $f$ now carries the increased strength of current due to the removal of the resistance of the coils 600 and 500 from the circuit, and the position of the armature of relay $f$ remains unchanged, whatever the position of transmitter $w$ may be. It will thus be seen that station $a$ is enabled to transmit a set of signals to station $b$, and station $b$ is enabled to simultaneously transmit a set of signals to station $a$.

In the modification shown in Fig. 2 the arrangement is in all respects the same except that a single dynamo 85 is alone employed. This is connected to the contact 13 to yield eighty-five volts, while a resistance 21 is connected to the dynamo 85 and to the transmitter branch 7. A resistance 22 is connected to the contact 12 and to ground 14, thus forming a shunt and leak to reduce the potential of the dynamo 85 to, say, forty volts. The specific proportions given are approximately correct and are given for the purpose of description and illustration, but are not to be considered in any sense a limitation upon the improvement described and claimed by me. It is to be noticed that whatever may be the resistance of the line-wire $c$ no change in adjustment or balancing is required at the substation $b$. The relay $f$ being once in position is fixed for all conditions of line.

What I claim, and desire to secure by Letters Patent, is—

1. The combination in a multiple telegraph at one station of a main line, a branch line, an adjustable resistance in said branch line, a suitable receiving instrument having two coils, one in said main line the other in said branch line, a suitable transmitter having contacts connected to the junction of the main and branch lines and to two sources of electricity of the same polarity and of respectively different potential; and at a second station, a receiving instrument having two coils wound on a core of magnetic metal in the same direction, one coil having a greater resistance and a greater number of turns than the other, an artificial line, a transmitter connected to the junction of said coils and a ground-contact for said transmitter.

2. The combination in a duplex telegraph at one station of a receiving instrument having two equal coils and a transmitter having contacts connected to sources of electricity of the same polarity and respectively different potential; and at a second station, an artificial line, a receiving instrument having two coils wound in the same direction, of unequal resistance, a transmitter connected to the junction of said coils and a ground-contact for said transmitter.

3. In a duplex telegraph, at one station, the combination with the main line of an artificial line, a differential relay having a coil in each line, a transmitter branch, a transmitter having two contacts, means for supplying said contacts with electric currents of respectively different potential; and at a second station, an artificial line, a relay having two coils of unequal resistance, a grounded branch line connected to the junction of said coils and a make-and-break transmitter in said grounded branch.

4. In a duplex telegraph, the combination with a main line, at one station, of means for throwing upon the line current impulses of two different potentials and one polarity; and at a second station a two-coil receiving instrument, an artificial line, a grounded branch connected to the junction of said two coils, a make-and-break transmitter in said grounded branch, the coils of said receiving instrument being arranged and proportioned so that the ampere-turns in series are substantially equal to the ampere-turns of the smaller coil when the other coil and the artificial line are short-circuited.

5. In a duplex telegraph, at one station, a suitable source of electricity, a suitable transmitter and means for throwing upon the line current impulses of uniform polarity and two different potentials; and at a second station an artificial line, a relay having two coils of different resistance, the smaller coil being located in the main line and the larger coil being located in the artificial line, and means for including the main and artificial lines in series with said coils and for short-circuiting the artificial line and its coil.

JOSEPH W. LARISH.

Witnesses:
J. R. FRITH, Jr.,
A. M. DONLEVY.